(12) United States Patent
Bowden, III et al.

(10) Patent No.: US 6,961,046 B2
(45) Date of Patent: *Nov. 1, 2005

(54) WIRELESS DIGITAL PICTURE DISPLAY FRAME

(75) Inventors: George R. Bowden, III, Portland, OR (US); Rune A. Skarbo, Hillsboro, OR (US); Anthony C. Salvador, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/785,282

(22) Filed: Feb. 24, 2004

(65) Prior Publication Data

US 2004/0174327 A1 Sep. 9, 2004

Related U.S. Application Data

(63) Continuation of application No. 09/004,710, filed on Jan. 7, 1998, now Pat. No. 6,717,567.

(51) Int. Cl.$^7$ ................................................. G06G 5/00
(52) U.S. Cl. ....................................... 345/104; 345/328
(58) Field of Search ............................... 345/2–3, 104, 345/204, 328, 146, 901; 348/12–17, 207, 14.01–14.02, 231, 794; 358/527; 360/2, 5; 361/679–682; 369/14; 386/55–69; 704/272

(56) References Cited

U.S. PATENT DOCUMENTS

| | | | |
|---|---|---|---|
| 5,049,862 A | | 9/1991 | Dao et al. |
| 5,130,794 A | | 7/1992 | Ritchey |
| 5,181,200 A | | 1/1993 | Harrison |
| 5,485,504 A | | 1/1996 | Ohnsorge |
| 5,504,836 A | * | 4/1996 | Loudermilk ................ 704/272 |
| 5,670,992 A | | 9/1997 | Yasuhara et al. |
| 5,793,416 A | | 8/1998 | Rostoker et al. |
| 5,794,164 A | | 8/1998 | Beckert et al. |
| 5,796,428 A | | 8/1998 | Matsumoto et al. |
| 5,808,224 A | | 9/1998 | Kato |
| 5,818,441 A | * | 10/1998 | Throckmorton et al. ..... 715/717 |
| 5,835,577 A | | 11/1998 | Disanto et al. |
| 5,855,483 A | | 1/1999 | Collins et al. |
| 5,864,331 A | | 1/1999 | Anand et al. |
| 5,870,771 A | | 2/1999 | Oberg |
| 5,900,875 A | | 5/1999 | Haitani et al. |
| 5,949,408 A | | 9/1999 | Kang et al. |
| 5,986,634 A | | 11/1999 | Alioshin et al. |
| 6,011,537 A | | 1/2000 | Slotznick |
| 6,040,811 A | | 3/2000 | Malhi |
| 6,064,420 A | | 5/2000 | Harrison et al. |
| 6,072,521 A | | 6/2000 | Harrison et al. |
| 6,073,168 A | | 6/2000 | Mighdoll et al. |
| 6,085,195 A | * | 7/2000 | Hoyt et al. ................... 707/10 |
| 6,209,132 B1 | | 3/2001 | Harrison et al. |
| 6,332,029 B1 | | 12/2001 | Azima et al. |
| 6,396,472 B1 | * | 5/2002 | Jacklin ....................... 345/104 |
| 6,717,567 B1 | * | 4/2004 | Bowden et al. ............. 345/104 |

OTHER PUBLICATIONS

All About Ceiva. Web Page [online]. Ceiva. [retrieved on May 21, 2000] Retrieved from the Internet:<URL:http://www.ceiva.com/learn_more.asp. pp. 1–6.

Ceiva Internet–Enabled Photo Frame. Web Page [online]. Amazon.com. [retrieved on May 3, 2000] Retrieved on the Internet:, URL:http://www.amazon.com/exec/obidos/ASIN/B00004SDFH/103=0003645–0796662. pp. 1–4.

* cited by examiner

*Primary Examiner*—Vijay Shankar
(74) *Attorney, Agent, or Firm*—Blakely, Sokoloff, Taylor & Zafman LLP

(57) ABSTRACT

A wireless digital picture display frame is disclosed. The display frame includes a wireless receiver that operates to receive a digital picture, a flat-panel display that operates to render the digital picture, and a processor that operates to control the receiving and rendering of the digital picture. The display frame further includes a frame with constructs that encircle the flat panel display, and form a housing to house the enumerated components. The digital picture may be a digital painting/graphics rendition or a digital photograph.

14 Claims, 2 Drawing Sheets

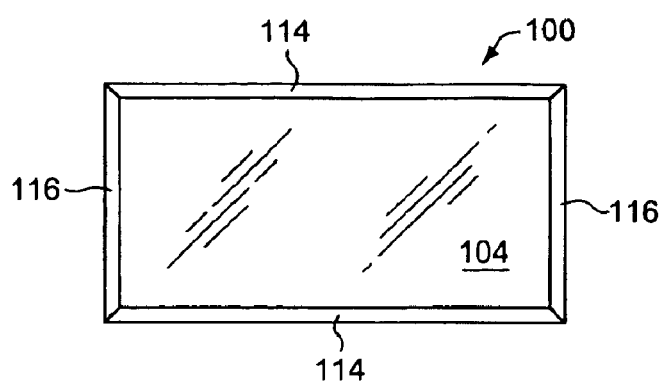
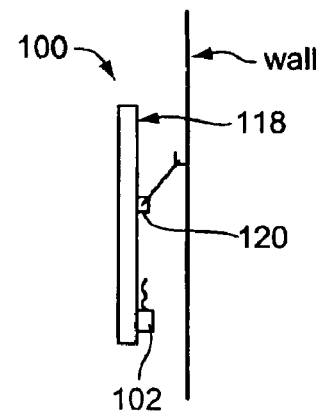
FIG. 1a  FIG. 1b
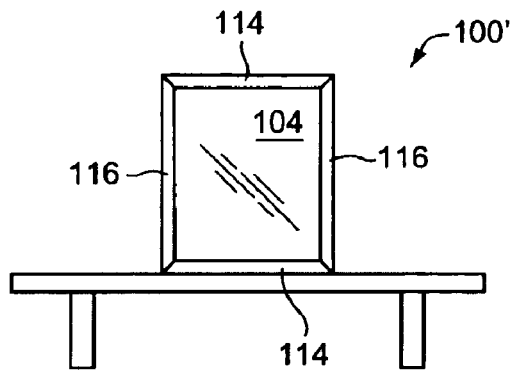
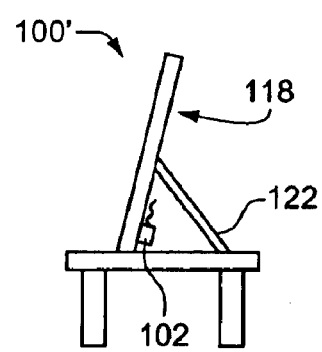
FIG. 2a  FIG. 2b
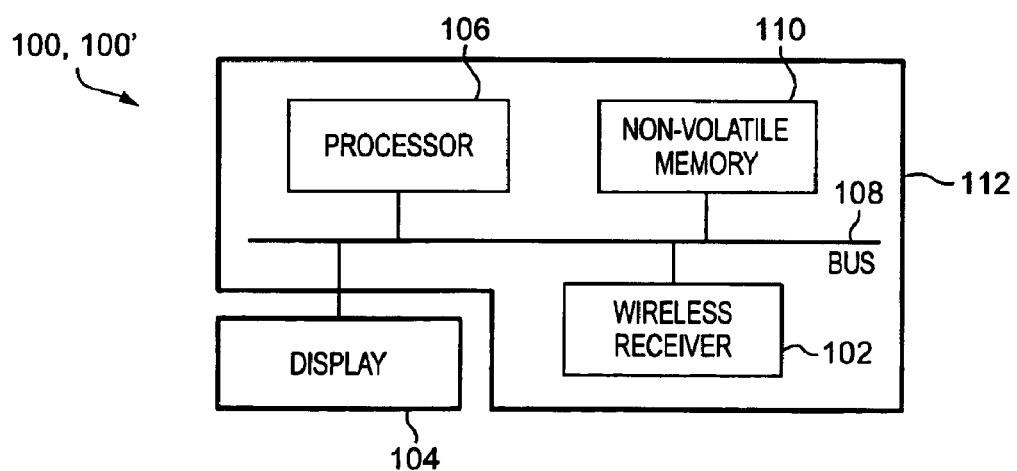
FIG. 3

WIRELESS DIGITAL PICTURE DISPLAY FRAME

RELATED APPLICATION AND CLAIM OF PRIORITY

This is a continuation of U.S. application Ser. No. 09/004,710, filed on Jan. 7, 1998, now U.S. Pat. No. 6,717,567 and priority is claimed thereof.

BACKGROUND OF THE INVENTION

1. Field of the Invention

The present invention relates to the fields of digital picture. More specifically, the present invention relates to display apparatuses for digital pictures.

2. Background Information

As advances in microprocessor and other related technologies continue to improve the price/performance of various electronic components, digital pictures, which as used herein include all amateur as well as professional digital renditions employing digital computers, cameras and the like, have become increasingly popular in recent years. Powerful personal computers including versatile painting and graphics layout software can now be purchased in only fraction of the price one would have to pay in just a handful of years earlier. Similarly, numerous relatively inexpensive but yet functionally rich digital cameras are now available in the marketplace. They are being used by amateur photographers for day-to-day routine casual photography as well as by professional photographers including photo journalists and artists for serious journalistic and artistic works.

Notwithstanding the superior versatility of these digital pictures over conventional artwork and film based photographs, most consumers of digital pictures produced by commercial artists as well as casual users of digital cameras, continue to display these digital pictures in the conventional manner, that is through prints of the renditions. The conventional approach suffers from a number of disadvantages, including the disadvantages of requiring manual mounting of each print, and remounting if a user desires to display a different print. Thus, a more efficient and cost effective way of displaying digital picture is desired.

BRIEF DESCRIPTION OF DRAWINGS

The present invention will be described by way of exemplary embodiments, but not limitations, illustrated in the accompanying drawings in which like references denote similar elements, and in which:

FIGS. 1a–1b are front and side views of a wall mount embodiment of the digital picture display frame of the present invention;

FIGS. 2a–2b are front and side views of a flat surface placement embodiment of the digital picture display of the present invention;

FIG. 3 illustrates one embodiment of the internal architectural of the digital picture display frames of FIGS. 1a–1b and 2a–2b.

DETAILED DESCRIPTION OF THE INVENTION

Figure 4:
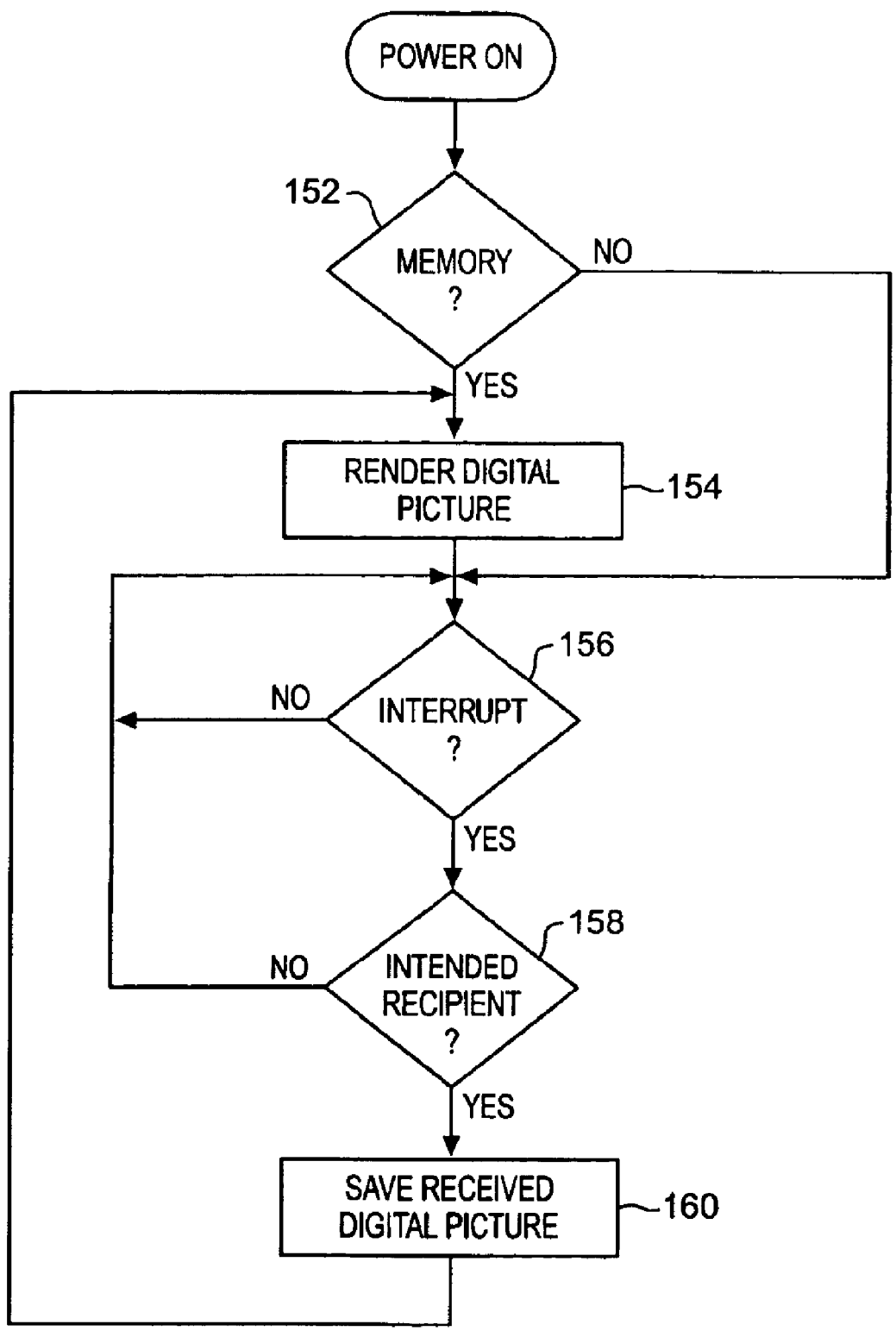
FIG. 4 is a block diagram illustrating one embodiment of the operational flow of the control logic provided to the processor of FIG. 3.

In the following description, various aspects of the present invention will be described. Those skilled in the art will also appreciate that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Referring now to FIGS. 1a–1b, 2a–2b, and 3, wherein two embodiments of the digital picture display frame 100 and 100' of the present invention are shown. FIGS. 1a–1b are front and side views of a wall mount embodiment 100, whereas FIGS. 2a–2b are front and side views of a flat-surface placement, such as table top, embodiment 100'. FIG. 3 illustrates one embodiment of the internal architectural of display frame 100 and 100'.

As shown, digital picture display frame 100 or 100' of the present invention includes wireless receiver 102 that operates to receive digital pictures from a remote external source, flat panel display 104 that operates to render the received digital pictures, and processor 106 that operates to control said receiving and rendering of the digital pictures on flat panel display 104. Wireless receiver 102, flat panel display 104, and processor 106 are coupled to each other by way of bus 108. Additionally, wireless receiver 102 is also coupled to interrupt processor 106 whenever it receives signals from a remote transmitter, e.g. the remote transmitter of the external source supplying display frame 100 or 100' with the digital pictures. These components 102-108 are disposed on printed circuit board 112.

For each of the illustrated embodiments, digital picture display frame 100 or 100' also includes non-volatile memory 110 that operates to store the received digital pictures. Non-volatile memory 110 is also coupled to wireless receiver 102, flat panel display 104 and processor 106 by way of bus 108; and disposed on printed circuit board 112. In alternate embodiments, the present invention may be practiced without non-volatile memory 110. For these alternate embodiments, digital picture display frame 100 or 100' is provided with a digital picture each time it powers on. For other embodiments, digital picture display frame 100 or 100' is further provided with the same or new digital pictures periodically thereafter.

For each of the illustrated embodiments, display frame 100 also includes a number of constructs, such as horizontal and vertical frame elements 114 and 116, and back plate 118, that encircle flat panel display 104, and form a housing to house the above enumerated components, i.e. wireless receiver 102, processor 106, and so forth.

Additionally, for the wall mounted embodiment, display frame 100 also includes hanging features 120 for facilitating hanging of display frame 100, whereas for the flat surface placement embodiment, display frame 100' also includes support features 122 for facilitating flat surface placement of display frame 100', e.g. on a table top, a dresser top and so forth. Hanging features 120 and support features 122 may be any one of a number of these features known in the art.

Digital pictures may be any digital painting/graphics renditions or digital photographs. The external source supplying the digital picture may be a digital camera, a palm computer, a laptop computer, a deskside computer or a desktop computer, equipped with an appropriate wireless transmitter for transmitting the digital pictures to display frame 100 or 100'. As alluded to earlier, these external sources may supply the same or different digital pictures periodically. In other words, a "slide show" of selected digital pictures may displayed.

As will be described in more details below, multiple ones of the digital picture display frame 100 or 100' of the present invention may be employed in an application, e.g. in a home application. In these applications, the external sources may supply different digital pictures to the different digital picture display frames 100 or 100'. For example, in a home application, the digital picture display frames 100 or 100' in the living room may be provided with different digital pictures than those provided to digital picture display frames 100 or 100' in the family room or bedroom.

Wireless receiver 102 is intended to represent a broad category of these receivers known in the art. Similarly, flat panel display 104 is also intended to represent a broad category of such displays known in the art, including and not limited to Processor 106 is intended to represent 8-bit or more microcontrollers (MCU), 16-bit or more digital signal processors (DSP), as well as 32-bit or more general purpose microprocessors (MP). Except for high end models with very high capacity and additional controls, it is expected that inexpensive 8-bit MCU will suffice.

Similarly, bus 108 and non-volatile memory 110 are intended to represent a number of these inexpensive components known in the art. In the case of non-volatile memory 110, either block erasable flash memory, electrically erasable programmable read-only-memory (EEPROM), complementary metal oxide semiconductor (CMOS) memory or equivalent may be used. The amount of memory required is application dependent, that is dependent on the size, format and resolution of the digital picture supported. Except for high end models, it is expected that a small amount of today's inexpensive non-volatile memory will suffice.

FIG. 4 illustrates one embodiment of the operational flow of the control logic provided to processor 106. As shown, upon power on, processor 106 determines if it is operating in an embodiment equipped with non-volatile memory 110 or not, step 152. If processor 106 is operating in an embodiment equipped with non-volatile memory 110, processor 106 causes a stored digital picture to be rendered on flat panel display 104, step 154, and then proceeds to step 156; else processor 106 skips step 154 and proceeds to step 156 directly. The displayed digital picture may be randomly chosen from the stored digital pictures or chosen in a predetermined manner, e.g. the first digital picture stored in non-volatile memory 110.

At step 156, processor 106 waits to be interrupted by wireless receiver 102. Recall that wireless receiver 102 interrupts processor 106 when it receives signals transmitted by a remote transmitter, e.g. the remote transmitter associated with the external source supplying a digital picture to display frame 100 or 100'. Upon interrupted by wireless receiver 102, processor 106 proceeds to step 158 to determine if the signals received by wireless receiver 102 is intended for the particular display frame 100 or 100'. If display frame 100 or 100' is not the intended recipient, processor 106 ignores the signals received, and returns to step 156 where it waits to be interrupted by wireless receiver 102 again. On the other hand, if display frame 100 or 100' is the intended recipient, and processor 106 is operating in an embodiment equipped with non-volatile memory 110, processor 106 causes the received digital picture to be stored in non-volatile memory 110, step 160. Upon saving the received digital picture, processor 106 proceeds to render the newly received digital picture, step 154. From step 154, processor 106 proceeds as described earlier. If display frame 100 or 100' is the intended recipient, and processor 106 is not operating in an embodiment equipped with non-volatile memory 110, processor 106 proceeds to step 154 directly. In one embodiment, if step 160 is performed, it is performed concurrently with step 154.

In one embodiment, each display frame 100 or 100' is equipped with a small non-volatile identification memory (not shown) for storing a unique identifier to uniquely identify the display frame 100 or 100'. For these embodiments, the remote external source includes at the beginning of its transmission an identifier identifying the intended recipient of the digital picture. Any one of a number of protocols may be employed to facilitate such identification process, which is well within the ability of those ordinarily skilled in the art. Accordingly, as alluded to earlier, multiple display frames 100 or 100' of the present invention may be deployed in the transmission space of the remote transmitter, for example, in an office or in a residence.

In general, those skilled in the art will recognize that the present invention is not limited by the details described; instead, the present invention can be practiced with modifications and alterations within the spirit and scope of the appended claims. In particular, various control features, such as forward, backward, and the like may be provided to the wireless picture display frame of the present invention. The description is thus to be regarded as illustrative instead of restrictive on the present invention.

Thus, a wireless digital picture display frame have been described.

What is claimed is:

1. A system for displaying digital pictures, comprising:
a frame having a frame body, the frame body shaped, dimensioned, and having an appearance of a conventional still picture frame;
a wireless receiver disposed inside the frame body to receive pictures;
a display co-located with the wireless receiver and framed by the frame body to render the pictures;
a processor coupled with the frame, the processor to control the receiving and rendering of the pictures, and having a unique identifier to uniquely identify the frame; and
a remote source to provide picture information to the frame, and to provide the unique identifier with the picture information to allow selective configuration of the pictures, the selective configuration including uniquely identifying intended recipients of the picture information using the unique identifier, and
a non-volatile memory coupled with the wireless receiver to store the digital picture.

2. The system of claim 1, wherein the unique identifier is provided at a beginning of a transmission.

3. The system of claim 1, wherein the pictures comprise one or more the following digital paintings, digital graphs, and digital photographs.

4. The system of claim 1, wherein the non-volatile memory comprises one or more of the following: a block erasable flash memory, an electrically erasable programmable read only memory (EEPROM), and a complementary metal oxide semiconductor (CMOS) memory.

5. The system of claim 1, wherein the processor comprises one or more of the following: an 8-bit or more microcontroller, a 16-bit or more digital signal processor, and a 32-bit or more general purpose microprocessor.

6. The system of claim 1, wherein the frame body comprises hanging features to hang the frame.

7. The system of claim 1, wherein the frame body comprises support features for surface placement of the frame.

8. An apparatus for displaying digital pictures, comprising:
- a frame having a frame body, the frame body shaped, dimensioned, and having an appearance of a conventional still picture frame;
- a processor coupled with the frame, the processor to control receiving and rendering of pictures, and having a unique identifier to uniquely identify the frame;
- a remote source to provide picture information to the frame, and to provide the unique identifier with the picture information to allow selective configuration of the pictures, the selective configuration including uniquely identifying intended recipients of the picture information using the unique identifier; and
- a wireless receiver disposed inside the frame body to receive the pictures.

9. The apparatus of claim 8, further comprises a display co-located with the wireless receiver and framed by the frame body to render the pictures.

10. The apparatus of claim 8, further comprises a non-volatile memory coupled with the wireless receiver to store the pictures.

11. A method for displaying digital pictures, comprising:
- distributing a frame having a frame body shaped, dimensioned, and having an appearance of a conventional still picture frame, the frame to receive and render pictures, wherein the receiving of the pictures is performed using a wireless receiver disposed inside the frame body:
- controlling the receiving and rendering of the pictures using a processor coupled with the frame, the processor having a unique identifier to uniquely identify the frame; and
- providing picture information to the frame via a remote source, and further providing the unique identifier with the picture information to allow selective configuration of the pictures, the selective configuration including uniquely identifying intended recipients of the picture information using the unique identifier.

12. The method of claim 11, further comprises providing the unique identifier at the beginning of transmission.

13. The method of claim 11, wherein the rendering of the pictures is performed using a display co-located with the wireless receiver and framed by the frame body.

14. The method of claim 11, further comprises storing the pictures using a non-volatile memory coupled with the wireless receiver.

* * * * *